May 10, 1966 R. A. GESELL 3,250,429
CURING VAT
Filed April 24, 1962

INVENTOR
ROBERT A. GESELL
BY
Lockwood, Woodard, Smith & Weikart
Attorneys

United States Patent Office 3,250,429
Patented May 10, 1966

3,250,429
CURING VAT
Robert A. Gesell, Edinburg, Ind., assignor to Amos-Thompson Corporation, Edinburg, Ind., a corporation of Indiana
Filed Apr. 24, 1962, Ser. No. 189,774
2 Claims. (Cl. 220—72)

This invention relates generally to a vat structure and in particular to a vat adapted for use in meat curing which is formed of elastomeric material.

In meat curing operations and the like relatively large pickling vats are utilized. Because of their size the vats must be capable of withstanding considerable hydrostatic pressure. The material from which vats are formed should also be relatively inert chemically so as to resist corrosion produced by the fluids contained in the vats. Since the vats are relatively large, any prior art structures fulfilling the strength and corrosion resistance requirements have been heavy and difficult to handle.

The concept of the present invention meets the difficulties referred to above by forming the vat of an elastomeric material, such as polyethylene, and in a stress resistant configuration. While elastomeric materials such as polyethylene have the desired chemically inert characteristic and are light and easy to handle, they have the disadvantage, for curing vat application, that their tensile strength is relatively low. This difficulty is overcome in the structure of the present invention by forming the side walls of the vat to incline toward a central vertical depression. A prestress-displacement inward is thus provided for the side walls. When the vat is then filled with pickling fluid and meat, for example, the somewhat flexible side walls of the vat move from a concave condition (using the vat exterior as a reference) to a flat or substantially planar condition, and in this displacement or flexing of the side walls under load the material at the inner face is placed primarily under compressive stress, thereby minimizing or reducing the weakness in resisting tensile stress which, as previously pointed out is a characteristic of elastomeric materials such as polyethylene.

The primary object of the present invention is to provide a vat for meat curing or the like formed of an elastomeric material such as polyethylene which is chemically inert and therefore resistant to corrosion, has relatively smooth surfaces to facilitate cleaning and has unusual strength, lightness in weight and therefore ease in handling.

This and other objects will become apparent as the description proceeds with reference to the accompanying drawings in which.

Figure 1:
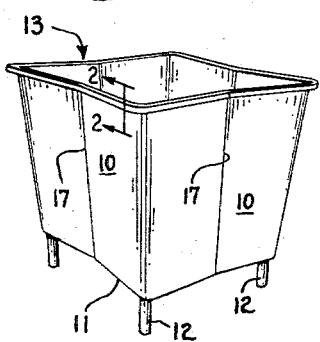
FIG. 1 is a perspective view of a vat embodying the present invention.

Referring initially to FIG. 1, a vat embodying the present invention may be integrally molded of an elastomeric material such as polyethylene. The vat has a generally rectangular configuration having side walls 10 tapering inwardly toward a base wall 11. The base 11 has attached thereto a suitable framework for supporting the base above the floor, the framework here shown comprising tubular legs 12. The supporting legs and accompanying framework are not here described in detail since they form no part of the present invention.

Figure 2:
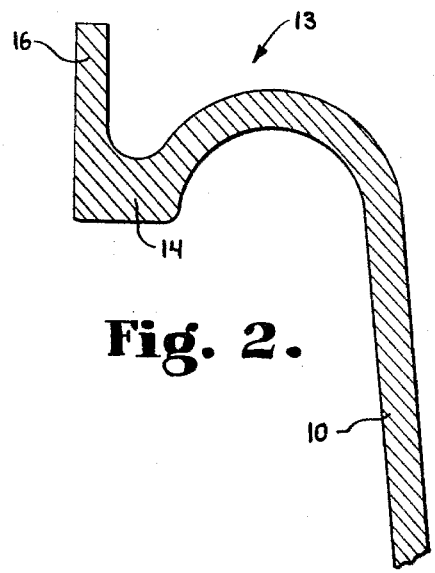
FIG. 2 is a fragmentary cross-sectional view taken generally along the line 2—2 of FIG. 1.

As may best be seen in FIG. 2 the upper marginal area of each of the side walls 10 is flanged outwardly as indicated at 13 in FIG. 2, the marginal area of the flange indicated at 14 having a thickened cross-section. The extreme terminal portion 16 of the outwardly flanged portion 13 may extend upwardly. The side walls, including their marginal areas 13, are each inclined inwardly toward a central, vertical depression 17 which extends the complete height of the side walls. When the vat is unfilled, as indicated in FIG. 1 and by solid lines in FIG. 3, the side walls of the vat are thus concave inwardly.

Figure 3:
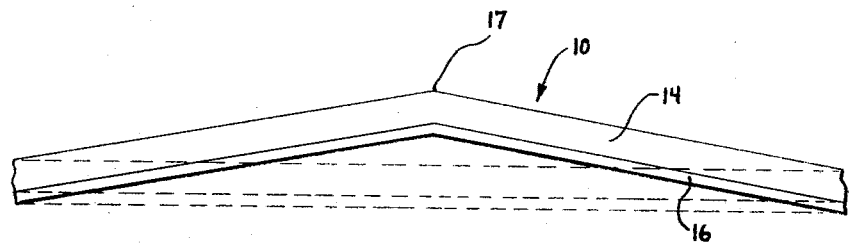
FIG. 3 is a top plan view of a portion of the side wall of the vat of FIG. 1 illustrating flexure of the side walls when the vat is filled.

Upon filling of the vats, hydrostatic pressure or the pressure of objects within the vat will cause the side walls to flex outwardly from the inwardly concave position of FIG. 1 toward a flat, planar position illustrated by broken lines in FIG. 3. In this movement or flexure under stress from the concave position to a flat position, it will be apparent that the side walls will be primarily under compressive stress. This is in contrast to the situation which would exist if the side walls, formed of elastomeric material, were in a flat condition prior to filling and were flexed convexly outwardly upon filling, such outward flexure placing the walls under tensile stress. As will be evident from FIGS. 2 and 3, the relatively thick cross-sectional area 14 of the flanged marginal portion of the side walls serves as a stay and tends to prevent over flexing of the side walls beyond the flat, planar position and thus prevents subjecting the side walls to extreme tensile stress against which the elastomeric side walls are inherently weak.

From the foregoing it will be evident that the prestressed displacement of the vat side walls inwardly compensates for or avoids the inherent weakness in resisting tensile stresses which is a characteristic of elastomeric materials such as polyethylene. Further, the formation of the side walls with the central depression 17 provides increased strength in resisting vertical forces when the vats are stacked. Because the vats are rectangular and because they do not bulge outwardly into a convex configuration beyond the vertical projection of flanged marginal portion when filled, less storage space is necessary for the vats. The downwardly tapering arrangement of the side walls permits nesting of unfilled vats. Because of the peculiar construction of the vats side walls, the highly advantageous chemically inert characteristic of elastomeric materials such as polyethylene may be utilized for containing corrosive fluid without encountering or suffering from the inherent weakness of such materials when stressed in tension.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A vat for accommodating meat curing fluid or the like integrally molded of polyethylene in a generally rectangular configuration having side walls tapering inwardly toward a base wall, the upper marginal area of each of said side walls being flanged outwardly with the marginal area of the flange having a thickened cross-section, each of said side walls including its marginal area being inclined inwardly toward a central, vertical depression whereby with the vat empty the side walls are concave inwardly and upon filling of the vat the side walls flex outwardly from the inwardly concave position toward a flat, planar position with the said thickened cross-sectional flange area tending to prevent over-flexing of the side walls beyond the flat, planar position.

2. A vat for accommodating meat curing fluid or the like formed of elastomeric material in a general rectangular configuration having side walls tapering inwardly toward a base wall, the upper marginal area of each of said side walls being flanged outwardly with the marginal area of the flange having a thickened cross-section, each of said side walls including its marginal area being inclined inwardly toward a central, vertical depression whereby with the vat empty the side walls are concave inwardly and upon filling of the vat the side walls flex outwardly from the inwardly concave position toward a flat, planar position with the said thickened cross-sectional flange area tending to prevent over-flexing of the side walls beyond the flat, planar position.

References Cited by the Examiner
UNITED STATES PATENTS

| | | | |
|---|---|---|---|
| 81,143 | 8/1868 | Cook | 220—72 |
| 152,168 | 6/1874 | Renwick | 220—72 |
| 459,972 | 9/1891 | Chubbuck. | |
| 1,923,522 | 8/1933 | Whitehouse. | |
| 1,942,984 | 1/1934 | Spaeth | 220—72 |
| 2,316,296 | 4/1943 | Simonds | 220—72 |
| 2,773,624 | 12/1956 | Knieriem et al. | 220—72 X |
| 2,873,782 | 2/1959 | Gunn | 150—48 |
| 2,907,491 | 10/1959 | Gunn | 150—0.5 X |

LOUIS G. MANCENE, *Primary Examiner.*

THERON E. CONDON, *Examiner.*